United States Patent [19]

Alvarez et al.

[11] Patent Number: 5,070,153

[45] Date of Patent: * Dec. 3, 1991

[54] MOLDED POLYBENZIMIDAZOLE/-POLYARYLENEKETONE ARTICLES AND METHOD OF MANUFACTURE

[75] Inventors: Edwardo Alvarez; Lorenzo P. DiSano, both of Houston, Tex.; Bennett C. Ward, Charlotte, N.C.

[73] Assignee: Hoechst Celanese Corporation, Charlotte, N.C.

[*] Notice: The portion of the term of this patent subsequent to Mar. 27, 2007 has been disclaimed.

[21] Appl. No.: 340,118

[22] Filed: Apr. 13, 1989

[51] Int. Cl.$^5$ .............................................. G08L 49/06
[52] U.S. Cl. .................................... 525/420; 525/435; 264/211.12
[58] Field of Search ............................... 525/435, 420; 264/211.12

[56] References Cited

U.S. PATENT DOCUMENTS 4,912,176  3/1990  Alvarez et al. ..................... 525/435

*Primary Examiner*—Ana L. Carrillo
*Attorney, Agent, or Firm*—Robert H. Hammer, III

[57] ABSTRACT

Molded article having improved thermal resistance and strength formed from a homogeneous mixture comprising from about 5 to 75 percent by weight polybenzimidazole and from about 95 to 25 percent by weight of a polyaryleneketone. These articles are obtained by injection molding techniques.

6 Claims, No Drawings

MOLDED POLYBENZIMIDAZOLE/POLYARYLENEKETONE ARTICLES AND METHOD OF MANUFACTURE

FIELD AND BACKGROUND OF THE INVENTION

The present invention relates to molded articles and methods for manufacturing such articles. More particularly this invention is directed to injection molded articles formed from a blend of a polybenzimidazole and a polyaryleneketone.

Polybenzimidazoles are polymers of high thermal stability and are resistant to oxidative or hydrolytic degradation. Polybenzimidazole polymers may be prepared by melt polymerizing an aromatic tetraamine and a diphenylester or an anhydride of an aromatic or heterocyclic dicarboxylic acid in a one or two-stage process; see, for example H. Vogle and C. S. Marvel, Journal of Polymer Science, Col. Vol. L, pp. 511–539 (1961); and U.S. Pat. Nos. Re. 26,065; 3,174,947; 3,509,108; 3,551,389; 3,433,772; and 3,655,632. In particular, U.S. Pat. No. 3,551,389 discloses a two-stage process for the production of aromatic polybenzimidazoles, in which the monomers are heated at a temperature above 170° C. in a first-stage melt polymerization zone until a foamed prepolymer is formed. The foamed prepolymer is cooled, pulverized, and introduced into a second stage polymerization zone where it is heated again to yield a polybenzimidazole polymer product. Polybenzimidazoles also may be prepared from the free dicarboxylic acids or the methyl esters of such acids.

It is, however, difficult to mold articles from polybenzimidazole resins, and in fact, there are no known techniques with respect to injection molding polybenzimidazole or blends thereof. Compression molding of polybenzimidazole high polymers is known and is described in U.S. Pat. No. 3,340,325. As described therein, a prepolymer was prepared by reacting a diphenylester of an aromatic dicarboxylic acid and an aromatic tetraamine to a degree short of substantial infusibility. The prepolymer is fusible at temperatures in the range of from about 200° F. to about 500° F. A mixture of the polybenzimidazole prepolymer and polybenzimidazole high polymer was introduced into a mold, sufficient heat and pressure was applied to cause the prepolymer to become fluid and the mixture was maintained under this heat and pressure to sufficiently cure the prepolymer.

Compression molding of polybenzimidazole high polymer has been reported by Jones et al (International Conference on Composite Materials IV, AIME, Warrendale, Pa., p. 1591). Polybenzimidazole was compression molded at a temperature of 600°–800° F. at a pressure of 2000 psi and a final hold time of over one hour. However, employing the described process permits only one part to be made per mold per cycle, with total cycle times limited to one per normal eight-hour shift and part thickness was effectively limited to less than one inch.

It is also known to utilize matched metal dye compression molding of the polybenzimidazole at temperatures of up to 875° F., pressures of 5,000 to 10,000 psi and cycle times of 4–8 hours to result in molded polybenzimidazole parts. These parts are, however, limited to a quarter inch in thickness with tensile strengths of up to 21,000 psi. These molded articles typically exhibit significant blistering and dimensional distortion when exposed to temperatures of 900° F. for as little as five minutes.

The manufacture of sintered polybenzimidazole articles is disclosed in U.S. Pat. No. 4,814,530. As described therein, a dried particulate polybenzimidazole resin is compacted under a pressure of 2,000 to 10,000 psi in a mold, heated to a temperature in the range of 825° to 925° F., cooled to a temperature below 800° F. and subsequently postcured.

These various techniques for molding polybenzimidazole, however, typically require the use of high temperature and high pressure, thereby reducing the processability of the polybenzimidazole and limiting the applications thereof. Moreover, there are no known techniques prior to the present invention with respect to injection molding polybenzimidazole or blends thereof.

With respect to molding polyaryleneketones, various molding techniques, such as sinter molding, injection molding and compression molding are known in the art. However, molded articles of polyaryleneketone have limited thermal and pressure resistance compared to polybenzimidazoles and thus also have limited utility.

SUMMARY OF THE INVENTION

The present invention provides an injection molded article having improved thermal resistance and mechanical properties. The article is formed from a homogeneous mixture comprising from about 5 to 75 percent by weight polybenzimidazole resin and from about 95 to 25 percent by weight of a polyaryleneketone. This mixture may also include from 5 to 15 percent by weight of cut fibers of polybenzimidazole. The present invention also includes processes for forming molded articles which utilize a polymer blend having the above mixtures.

DETAILED DESCRIPTION OF THE INVENTION

Polybenzimidazoles produced utilizing certain dicarboxylic compounds as monomers have repeating units of the following formula:

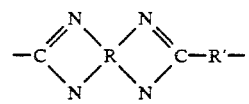

wherein R is a tetravalent aromatic nucleus with the nitrogen atoms forming the benzimidazole rings being paired upon adjacent carbon atoms, i.e., ortho carbon atoms, of the aromatic nucleus, and R' is a member of the class consisting of an aromatic ring; an alkylene group (preferably having 4 to 8 carbon atoms); and a heterocyclic ring such as pyridine, pyrazine, furan, quinoline, thiophene, and pyran. Depending on whether the dicarboxylic acid moieties in the dicarboxylic monomer component are the same or different, R' may be the same or randomly different among the repeating units along the polymer chain. Moreover, depending on whether one or more than one tetraamine monomer is utilized in the polymerization, R may also be the same or randomly different along the polymer chain.

The following generalized equation illustrates the condensation reaction which occurs in forming the polybenzimidazoles having the recurring units of the foregoing formula:

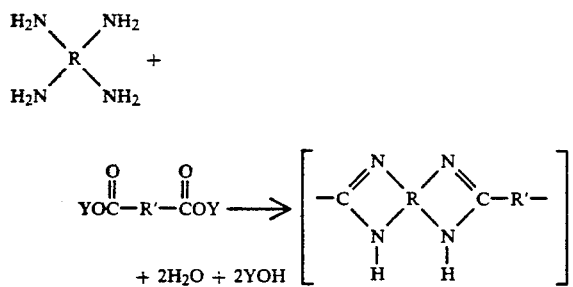

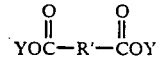

in which the Y's may be hydrogen, aryl or alkyl with no more than 95% of the Y's being hydrogen or phenyl. The dicarboxylic component may therefore consist of a mixture of a free acid with at least at one diester and/or monoester; a mixture of diester(s) and/or monoester(s); or a single dialkyl ester, monoester or mixed aryl-alkyl or alkyl/alkyl ester but can consist completely of free acid or diphenyl ester. When Y is alkyl, it preferably contains 1 to 5 carbon atoms and is most preferably methyl. When Y is aryl, it may be any monovalent aromatic group obtained by filling with hydrogen all the valences but one of the aromatic groups which may be R or R' as disclosed previously, either unsubstituted or substituted with any inert monovalent radical such as alkyl or alkoxy containing 1 to 5 carbon atoms. Examples of such aryl groups are phenyl, naphthyl, the three possible phenylphenyl radicals and the three possible tolyl radicals. The preferred aryl group is usually phenyl.

in which R and R' are as previously defined. Such polybenzimidazoles are produced by the reaction of a mixture of (1) at least one aromatic tetraamine containing two groups of amine substituents, the amine substituents in each group being in an ortho position relative to each other, and (2) a dicarboxylic component as indicated in the foregoing equation and as more completely defined hereinafter.

Aromatic tetraamines which may be used, for example, are those with the following formulas:

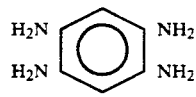

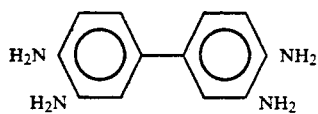

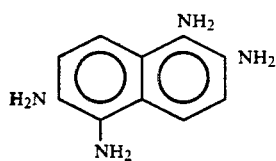

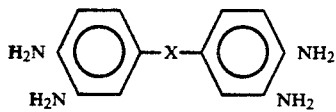

where X represents —O—, —S—, —SO2, —C—, or a lower alkylene group, such as —CH2—, —(CH2)2—, or —C(CH3)2—. Among such aromatic tetraamines may be mentioned, for example, 1,2,4,5-tetraaminoenzene; 1,2,5,6-tetraaminonaphthalene; 2,3,6,7 tetraaminonaphthalene; 3,3',4,4'-tetraaminodiphenyl methane; 3,3',4,4'-tetraaminodiphenyl ethane; 3,3',4,4'-tetraaminodiphenyl-2,2-propane; 3,3',4,4'-tetraaminodiphenyl thioether; and 3,3',4,4'-tetraaminodiphenyl sulfone. The preferred aromatic tetraamine is 3,3',4,4'-tetraaminobiphenyl.

The compounds which comprise the dicarboxylic component of this invention are defined by the formula:

The dicarboxylic acids which are suitable in free or esterified form as part of the dicarboxylic component as previously described for use in the production of polybenzimidazoles by the process of the present invention include aromatic dicarboxylic acids; aliphatic dicarboxylic acids (preferably, those having 4 to 8 carbon atoms); and heterocyclic dicarboxylic acids wherein the carboxylic groups are substituents upon carbon atoms in a ring compound such as pyridine, pyrazine, furan, quinoline, thiophen, and pyran.

Dicarboxylic acids which may be utilized in free or esterified form as described are aromatic dicarboxylic acids such as those illustrated below:

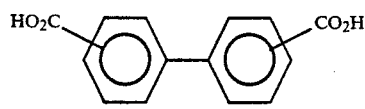

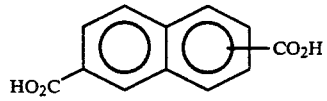

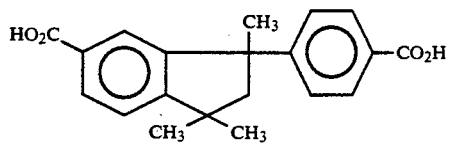

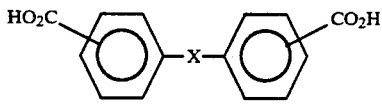

where X is as defined above. For example, the following diacids can suitably be employed: isophthalic acid; terephthalic acid; 4,4'-biphenydicarboxylic acid; 1,4- naphthalene-dicarboxylic acid; diphenic acid (2,2'-biphenyldicarboxylic acid); phenylindandicarboxylic acid; 1,6-napthalenedicarboxylic acid; 2,6-naphthalenedicarboxylic acid; 4,4'-diphenyletherdicarboxylic acid; 4,4'-diphenylthioetherdicarboxylic acid. Isophthalic acid is the dicarboxylic acid which in free or esterified form is most preferred for use in the process of the present invention.

The dicarboxylic component can be one of the following combinations: 1) at least one free dicarboxylic acid and at least one diphenyl ester of a dicarboxylic acid; 2) at least one free dicarboxylic acid and at least one dialkyl ester of a dicarboxylic acid, and 3) at least one diphenyl ester of a dicarboxylic acid and at least one dialkyl ester of a dicarboxylic; and 4) at least one dialkyl ester of a dicarboxylic acid. The dicarboxylic moieties of the compounds of each combination may be the same or different and the alkyl groups of the alkyl esters o combinations 2), 3) and 4) generally contain 1 to 5 carbon atoms and are most preferably methyl.

The dicarboxylic component can be employed in a ratio of about 1 mole of total dicarboxylic component per mole or aromatic tetraamine. However, the optimal ratio of reactants in a particular polymerization system can be easily determined by one of ordinary skill in the art.

Examples of polybenzimidazoles which may be prepared according to the process as described above include:

poly-2,2'-(m-phenylene)-5,5'-bibenzimidazole;
poly-2,2'-(biphenylene-2''2''')-5,5'-bibenzimidazole;
poly-2,2'-(biphenylene-4''4''')-5,5'-bibenzimidazole:
poly-2,2'-(1'',1'',3''trimethylindanylene)-3''5''-p-phenylene-5,5'-bibenzimidazole:
2,2'-(m-phenylene)-5,5'-bibenzimidazole/2,2-(1'',1'',3''-trimethylindanylene)-5'',3''-(p-phenylene)-5,5'-bibenzimidazole copolymer;
2,2'-(m-phenylene)-5,5'-bibenzimidazole 2,2'-biphenylene-2'',2'''-5,5'-bibenzimidazole copolymer;
poly-2,2'-(furylene-2'',5'')-5,5'-bibenzimidazole;
poly-2,2'-(naphthalene-1'',6'')-5,5'-bibenzimidazole;
poly-2,2'-(naphthalene-2'',6'')-5,5'-bibenzimidazole;
poly-2,2'-amylene-5,5'-bibenzimidazole;
poly-2,2'-octamethylene-5,5'-bibenzimidazole;
poly-2,2'-(m-phenylene)-diimidazobenzene;
poly-2,2'-cyclohexenyl-5,5'-bibenzimidazole;
poly-2,2'-(m-phenylene)-5,5'-di(benzimidazole) ether;
poly-2,2'-(m-phenylene)-5,5'-di(benzimidazole) sulfide;
poly-2,2'-(m-phenylene)-5,5'-di(benzimidazole) sulfone:
poly-2,2'-(m-phenylene)-5,5'-di(benzimidazole) methane;
poly-2,2'''-(m-phenylene)-5,5''-di(benzimidazole) propane-2,2; and
poly-ethylene-1,2-2,2''-(m-phenylene)-5,5''-dibenzimidazole) ethylene-1,2 where the double bonds of the ethylene groups are intact in the final polymer.

Poly-1,2'-(m-phenylene)-5,5'-bibenzimidazole, a preferred polymer, can be prepared by the reaction of 3,3',4,4'-tetraaminobiphenyl with a combination of isophthalic acid with diphenyl isophthalate or with a dialkyl isophthalate such as dimethyl isophthalate; a combination of diphenyl isophthalate and a dialkyl isophthalate such as dimethyl isophthalate; or at least one dialkyl isophthalate such as dimethyl isophthalate, as the sole dicarboxylic component.

With respect to the polyaryleneketones, they have the general formula:

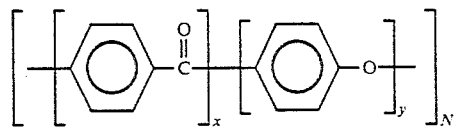

where X, Y and N are integers. An exemplary polyaryleneketone is polyetherketone having the repeating unit:

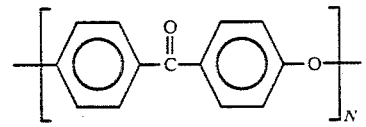

Polyetheretherketone, having the repeating unit:

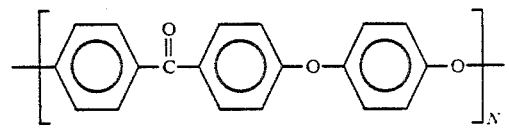

is also a crystalline thermoplastic having properties similar to those of polyetherketones.

A third exemplary polyarlyeneketone is polyetheretherketoneketone having the repeating unit:

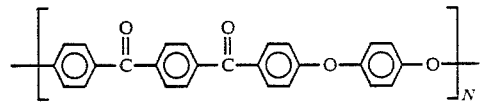

A fourth exemplary polyaryleneketone is polyetherketoneketone having the repeating unit:

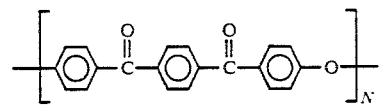

A fifth exemplary polyaryleneketone useful in the practice of the invention is polyaryletherketone and has the following structures:

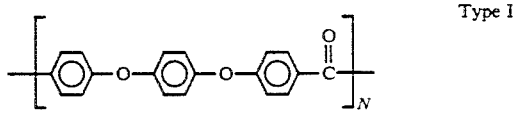
Type I

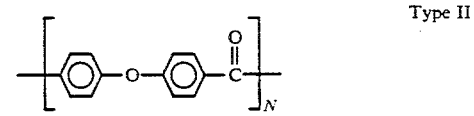
Type II

In general polybenzimidazoles have good chemical resistance, high compressive strength and retain these properties at high temperature. Polyaryleneketones have good chemical resistance and moderate compressive strength but exhibit poorer mechanical properties at elevated temperatures as compared to polybenzimidazole. As stated above, articles molded of polybenzimidazole have limited utility because of processing limitations, whereas articles molded of polyaryleneketones have limited utility because of limited thermal and pressure resistance.

It has been found in the present invention that a injection molded article can be produced having improved thermal and chemical resistance and strength properties by using a homogeneous blend of polybenzimidazole and polyaryleneketone. The blend or mixture comprises from about 5 to 75 percent by weight polybenzimidazole and from about 95 to 25 percent by weight of a polyaryleneketone.

Molded articles of the polybenzimidazole/polyaryleneketone blend can be produced by injection molding. The polybenzimidazole and polyaryleneketone polymers are dry blended to form a homogeneous mixture. The blended resin powders are then extruded at a temperature of about 800° to 950° F. and preferably at a temperature of about 850° to 880° F. The extruded material is then cooled by passing the extrudate into a water bath where it is chopped into pellets.

These pellets are then injection molded at a barrel temperature of from about 725° to 875° F., and a nozzle temperature of from about 750° to 800° F. into a mold having a temperature of from about 425° to 475° F. The injection molded article is then annealed at a temperature of at least 450° F. for at least one hour per quarter inch of nominal thickness. Exemplary molded articles include gaskets, seals, O-ring back ups and valve seats.

Molded articles can also be formed by adding polybenzimidazole chopped fibers having a length of from 1/64 inch to about ½ inch, with 1/32 inch being preferred, and may be mixed in with the blend in amounts ranging from about 5 to 15 percent by weight with 10 percent being preferred. The chopped fibers may be either sulfonated or unsulfonated. The addition of the fibers not only improves the mechanical and chemical properties as above, but also the thermal stability of the articles and specifically the weight loss temperature can be improved by about 10 to 20 percent.

The injection molded articles of this invention exhibit improved mechanical, thermal and chemical properties as compared to conventional polyaryleneketones and filled polyaryleneketones. The molded article typically has a tensile strength and modulus of greater than 16,000 psi and $0.69 \times 10^6$ psi, respectively (ASTM D 638). The articles exhibit more resiliency than polybenzimidazole articles using existing molding techniques and improved thermal resistance when compared to molded polyaryleneketone articles.

The articles are also highly chemically resistant to ketones, organic acids, oil well brines, oil well sour gas and hydrocarbons and have improved sealing properties. Accordingly, the molded articles ar particularly effective in applications where requirements cannot be met by other resins including virgin polyaryleneketones and filled polyaryleneketones such as in extreme high temperatures and pressures, in harsh chemical environments, or in applications where durability and wear resistance are important. Molded articles of manufacture having complex shapes and geometries are particularly useful in gaskets, seals, O-ring back ups and valve seats in oil wells, and in geothermal, petrochemical, and other industrial applications.

The invention will be further illustrated by way of the following examples, the specifics of which should be considered non-limiting and exemplary of the invention.

EXAMPLE I

Poly-2,2'-(m-phenylene)-5,5'-bibenzimidazole 100 mesh powder resin having an inherent viscosity of 0.55 dl/g was added to 100 mesh polyetherketone powder resin and dry mixed to form a blend having a weight percent ratio of 50/50 in a high speed blender. The blend was then extruded in a twin screw extruder equipped with a 3/16 inch diameter dye. The mixture was extruded at a temperature of 850°-950° F. at a feed rate of 10 lbs/hour and a screw speed of 100 rpm.

The extrudate was passed into a water trough and then into a pelletizer which chopped the extrudate into pellets of approximately 1/25 inch long by 3/16 inch diameter. The pellets were then dried in a vacuum oven and injection molded using an injection molding machine equipped with a desiccant hopper feed system, thermoset-type screw, straight bore nozzle, and a ASTM D638-type mold for type 5 tensile bars. Barrel temperatures were 725°-850° F., nozzle temperature was 770° F., screw speed was 75 rpm, clamp pressure was 75 tons, injection pressure was 15-20 kpsi, molding time was 45-55 seconds, and shot volume was one ounce.

The injection molded articles were then annealed at 470° F. for one hour.

EXAMPLE II

The process of Example I was repeated except polyetheretherketone resin powder was substituted for polyetherketone powder. The molded articles of Examples I and II were tested and the results presented below in Tables 1 and 2.

TABLE 1

| | | Compressive Properties | |
|---|---|---|---|
| Example No. | Weight % Ratio | Compressive Strength at 10% Strain, psi (ASTM D 695) | Compressive Modulus, mpsi (ASTM D 695) |
| I | 50/50 PBI/PEK | 29,000 | 0.62 |
| II | 50/50 PBI/PEEK | 27,500 | 0.60 |
| | Virgin PEK | 19,900 | 0.47 |
| | Virgin PEEK | 18,300 | 0.50 |

TABLE 2

| | | Tensile Properties | | |
|---|---|---|---|---|
| Example No. | Weight % Ratio | Ave. Tensile Strength, psi (ASTM D 638) | Tensile Strain, % (ASTM D 638) | Initial Modulus, mpsi (ASTM D 638) |
| I | 50/50 PBI/PEK | 17,300 | 2.8 | 0.77 |
| II | 50/50 PBI/PEEK | 18,100 | 3.9 | 0.74 |
| | Virgin PEK | 14,800 | 5.0 | 0.60 |
| | Virgin PEEK | 14,000 | 5.3 | 0.66 |

From the above it is apparent that the injection molded articles of the blend have superior compressive and tensile strength and modulus properties as compared to the same properties of injection molded articles of virgin polyetherketone or virgin polyetheretherketone.

EXAMPLE III

A seal used as a steam-sealing element was molded as described in Example I with the exception that 10 percent by weight of polybenzimidazole fibers cut in ⅛ inch lengths was mixed with the mixture of polybenzimidazole powder and polyetherketone powder. The sealing element was able to obtain a positive seal at 75° F. and at a pressure below 20 kpsi, and the seal was maintained in a live steam environment of 500° F. at a pressure of 20 kpsi in excess of 200 hours. Conventionally molded virgin and glass filled (30 to 40 weight percent glass) polyetheretherketones fail at temperatures of about 500° F. and pressures of 20 kpsi.

EXAMPLE IV

A molded article prepared by the process of Example I has a weight loss temperature of 878° F. A molded article prepared by the process of Example III has a weight loss temperature of 1004° F. By adding the polybenzimidazole fibers to the blend increased thermal stability was obtained. Weight loss temperature refers to the temperature at which the solid lost 10 percent of its weight.

While the present invention has been herein described in what is presently conceived to be the most preferred and exemplary embodiments thereof, those in this art may recognize that many modifications may be made thereof, which modifications shall be accorded the broadest scope of the appended claims so as to encompass all equivalent methods and products.

That which is claimed is:

1. An injection molded article having improved thermal resistance and strength formed from a homogeneous mixture comprising from about 5 to 75 percent by weight polybenzimidazole and from about 95 to 25 percent by weight of a polyaryleneketone.

2. A molded article according to claim 1 wherein the polyaryleneketone is selected from the group consisting of polyetherketone, polyetheretherketone, polyetheretherketoneketone and polyetherketoneketone 3. A molded article according to claim 1 wherein said homogeneous mixture comprises a blend of from about 33 to 50 percent by weight polybenzimidazole and from about 67 to 50 percent by weight of a polyaryleneketone.

4. A molded article according to claim 1 wherein said article is selected from the group consisting of O-ring back ups, seals, gaskets and valve seats.

5. A molded article according to claim 1 wherein the polybenzimidazole is poly-2,2'-(m-phenylene)-5,5'-bibenzimidazole.

6. A process for forming a molded article which comprises forming a homogeneous polymer blend comprising from about 5 to about 75 percent by weight polybenzimidazole and from about 95 percent to about 25 percent by weight polyaryleneketone, extruding the blend into pellets at a temperature of from about 800° to 950° F., injection molding the pellets at a barrel temperature of from about 725° to 875° F. and thereafter annealing the molded article at a temperature of at least 450° F. for at least one hour per quarter inch of nominal thickness.

* * * * *